(12) United States Patent
Takezoe et al.

(10) Patent No.: US 8,960,169 B2
(45) Date of Patent: Feb. 24, 2015

(54) EGR CONTROLLER FOR INTERNAL COMBUSTION ENGINE

(75) Inventors: Hiroyuki Takezoe, Kariya (JP); Hiroki Nogami, Kariya (JP); Hideaki Ichihara, Obu (JP); Hiroshi Katsurahara, Okazaki (JP)

(73) Assignee: Denso Corporation, Kariya (JP)

( * ) Notice: Subject to any disclaimer, the term of this patent is extended or adjusted under 35 U.S.C. 154(b) by 442 days.

(21) Appl. No.: 13/531,182

(22) Filed: Jun. 22, 2012

(65) Prior Publication Data

US 2012/0325189 A1 Dec. 27, 2012

(30) Foreign Application Priority Data

Jun. 24, 2011 (JP) ................... 2011-140104

(51) Int. Cl.
*F02M 25/07* (2006.01)
*F02D 41/00* (2006.01)
*F02D 9/02* (2006.01)
*F02D 41/20* (2006.01)

(52) U.S. Cl.
CPC ....... *F02M 25/0793* (2013.01); *F02D 41/0077* (2013.01); *F02M 25/0756* (2013.01); *F02M 25/0773* (2013.01); *F02D 9/02* (2013.01); *F02D 41/20* (2013.01); *F02M 25/0727* (2013.01); *F02D 2041/2058* (2013.01); *F02D 2200/1012* (2013.01); *F02D 2250/16* (2013.01); *Y02T 10/47* (2013.01)

USPC ................................. 123/568.21; 123/568.23

(58) Field of Classification Search
CPC .................................................. F02M 25/0756
USPC ............. 123/538.11, 568.14, 568.18, 568.19, 123/568.21, 568.23
See application file for complete search history.

(56) References Cited

U.S. PATENT DOCUMENTS

| | | | |
|---|---|---|---|
| 2012/0303247 A1* | 11/2012 | Minami et al. ................. | 701/104 |
| 2012/0303249 A1* | 11/2012 | Minami et al. ................. | 701/112 |
| 2013/0133634 A1* | 5/2013 | Hiraoka et al. .......... | 123/568.16 |

FOREIGN PATENT DOCUMENTS

| | | |
|---|---|---|
| JP | B2-2560777 | 9/1996 |
| JP | 2001-82260 | 3/2001 |
| JP | 2010-116843 | 5/2010 |

\* cited by examiner

*Primary Examiner* — John Kwon
(74) *Attorney, Agent, or Firm* — Nixon & Vanderhye P.C.

(57) ABSTRACT

When a constant driving voltage is applied to a motor driving an EGR valve so that the EGR opening degree is varied, an angular speed of the EGR valve becomes minimal at a position where the driving torque of the EGR valve becomes maximal. In view of this, while an opening degree of the EGR valve is varied with a constant driving voltage applied to the motor, the EGR opening degree where the angular speed becomes minimal is learned as a full-close position.

10 Claims, 9 Drawing Sheets

EGR CONTROLLER FOR INTERNAL COMBUSTION ENGINE

CROSS-REFERENCE TO RELATED APPLICATION

This application is based on Japanese Patent Application No. 2011-140104 filed on Jun. 24, 2011, the disclosure of which is incorporated herein by reference.

TECHNICAL FIELD

The present disclosure relates to an exhaust gas recirculation (EGR) controller for an internal combustion engine, which is provided with an EGR valve which controls an exhaust gas quantity recirculating into an intake pipe.

BACKGROUND

In order to reduce exhaust emission, an internal combustion engine is provided with an exhaust gas recirculation (EGR) apparatus. The EGR apparatus has an EGR valve disposed in an EGR passage. The EGR valve adjusts quantity of EGR gas recirculating into an intake pipe through the EGR passage.

For example, Japanese patent No. 2560777 discloses an internal combustion engine having an EGR apparatus. An oxygen sensor is provided in an intake pipe. Based on output signals of the oxygen sensor, an opening degree of the EGR valve of when the EGR gas starts to recirculate is detected. Further, JP-2001-82260A discloses an internal combustion engine having an EGR apparatus in which an intake pressure sensor is provided in the intake pipe to detect an intake pressure. Based on the detected intake pressure, an opening degree of the EGR valve of when the EGR gas starts to recirculate is learned.

Especially, in a gasoline engine, since a sensitivity of combustion stability relative to an EGR gas quantity is relatively high, it is necessary to control the EGR gas quantity with high accuracy. When the exhaust gas recirculation is stopped, it is necessary for the EGR valve to accurately fully close the EGR passage to avoid an EGR gas leakage. Thus, it is necessary to accurately learn a full close position of the EGR valve.

SUMMARY

It is an object of the present disclosure to provide an exhaust gas recirculation (EGR) controller for an internal combustion engine, which is able to accurately learn a full-close position of an EGR valve.

According to the present disclosure, an exhaust gas recirculation controller for an internal combustion engine includes an EGR valve controlling an exhaust gas quantity recirculating into an intake pipe. The EGR valve is driven in a direction where an opening degree of the EGR valve is increased and in a direction where the opening degree of the EGR valve is decreased with respect to a full-close position of the EGR valve where a rotating friction of the EGR valve becomes a maximal value. The exhaust gas recirculation controller further includes a driving-torque-information detecting portion for detecting a driving-torque information about a driving torque of the EGR valve; and a full-close-position learning portion for learning an opening degree of the EGR valve as a full-close position, based on the driving-torque information, where the driving torque of the EGR valve becomes maximal.

When the EGR valve is positioned at the full-close position, the driving torque of the EGR valve becomes maximal. Thus, the EGR opening degree at which the driving torque becomes maximal is learned as the full-close position based on the driving-torque information. The full-close position of the EGR valve can be accurately learned.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
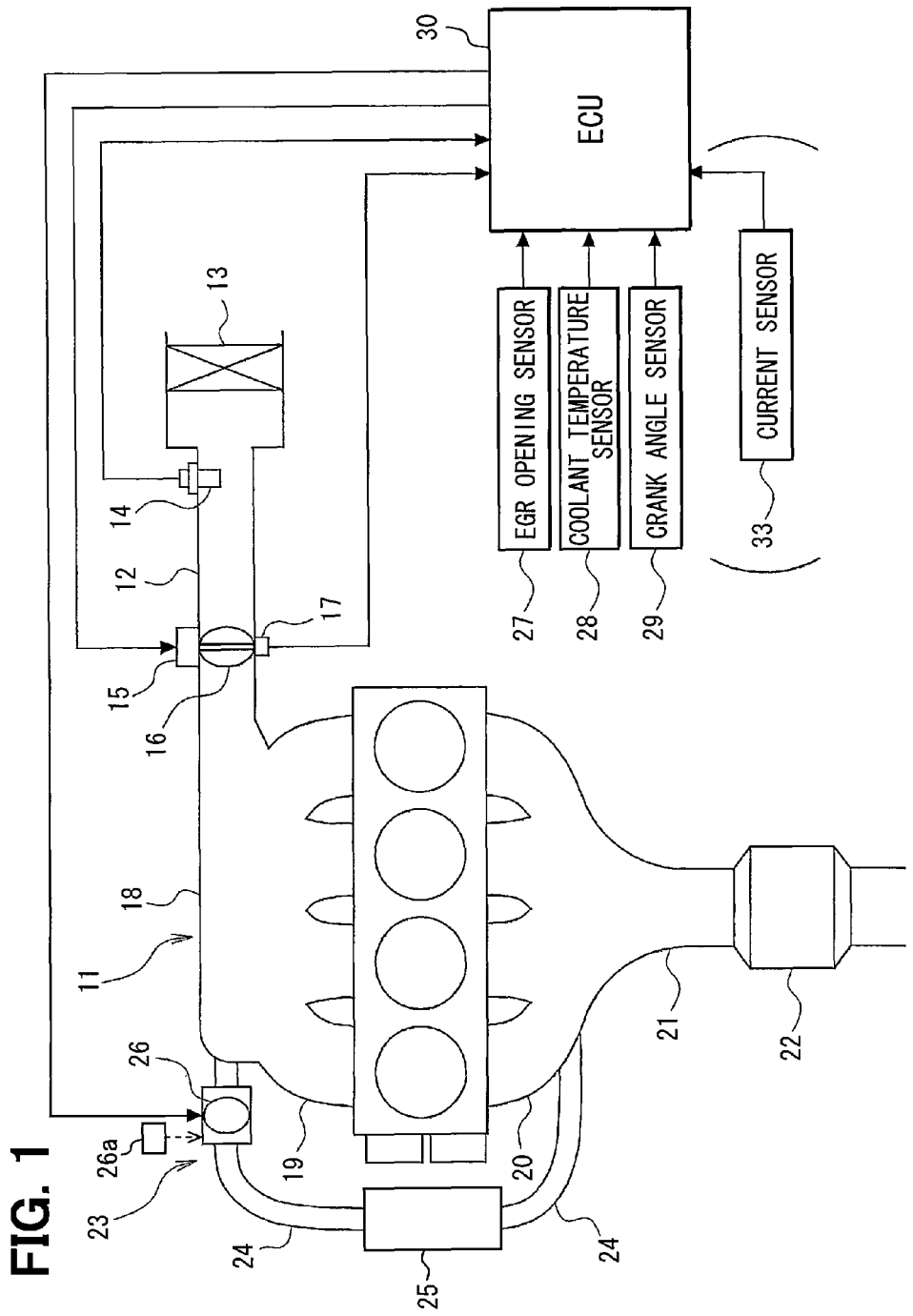
FIG. 1 is a schematic view of an engine control system according to a first embodiment of the present invention.

Embodiments of the present invention will be described, hereinafter.

[First Embodiment]

Referring to FIGS. 1 to 6, a first embodiment will be described hereinafter. An engine control system is schematically explained based on FIG. 1. An air cleaner 13 is arranged upstream of an intake pipe 12 of an internal combustion engine 11. An airflow meter 14 detecting an intake air flow rate is provided downstream of the air cleaner 13. A throttle valve 16 driven by a DC-motor 15 and a throttle position sensor 17 detecting a throttle position (throttle opening degree) are provided downstream of the air flow meter 14.

A surge tank 18 is provided downstream of the throttle valve 16. An intake manifold 19 which introduces air into each cylinder of the engine 11 is provided downstream of the surge tank 18, and a fuel injector (not shown) which injects fuel is provided for each cylinder. A spark plug (not shown) is mounted on a cylinder head of the engine 11 corresponding to each cylinder to ignite air-fuel mixture in each cylinder.

An exhaust manifold 20 of each cylinder is connected to an exhaust pipe 21. The exhaust pipe 21 (exhaust passage) is provided with a three-way catalyst 22 which reduces CO, HC, NOx, and the like contained in exhaust gas.

The engine 11 is provided with an EGR apparatus 23 which recirculates a part of exhaust gas flowing through an exhaust passage upstream of the catalyst 22 into an intake passage downstream of the throttle valve 16. The EGR apparatus 23 has an EGR pipe 24 connecting the exhaust pipe 21 downstream of the catalyst 22 and the intake pipe 12 downstream of the throttle valve 16. An EGR cooler 25 for cooling the EGR gas and an EGR valve 26 for adjusting an exhaust gas recirculation quantity (EGR-quantity) are provided in the EGR pipe 24. The EGR valve 26 is a butterfly valve. The EGR valve 26 is driven by a motor 26a such as a DC-motor and a stepping motor. Its opening degree is detected by an EGR opening sensor 27.

Figure 2A:
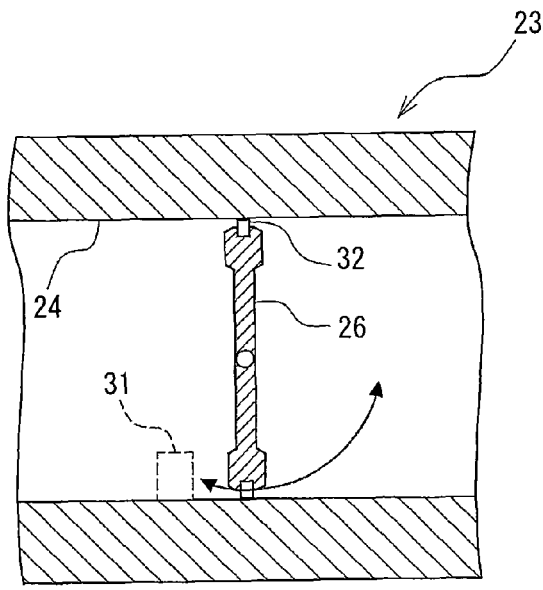
FIGS. 2A and 2B are charts for explaining a movable range of an EGR valve.
Figure 2B:
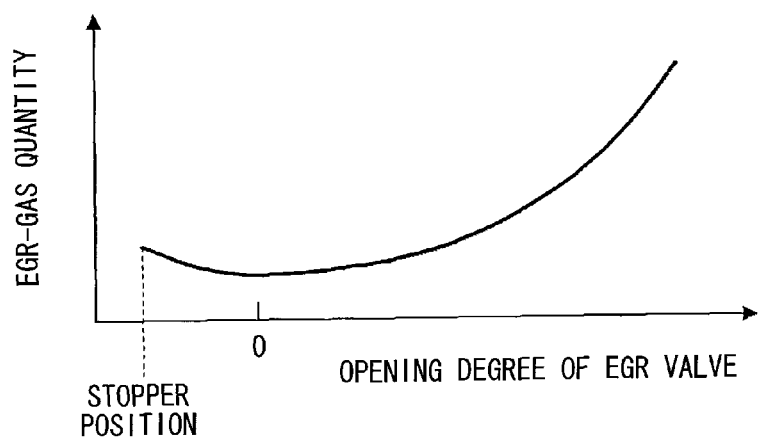

As shown in FIG. 2A, the EGR apparatus 23 has a stopper 31 in a gear box of the EGR valve 26. When the EGR valve 26 is rotated from a full-close position by small degree, the EGR valve 26 is brought into contact with the stopper 31. As shown in FIG. 2B, the EGR valve 26 can rotate in a valve-close direction and a valve-open direction (clockwise and anti-clockwise) with respect to the full-close position. Therefore, the full-close position of the EGR valve 26 does not agree with the position at which the EGR valve 26 is in contact with the stopper 31.

Figure 3:
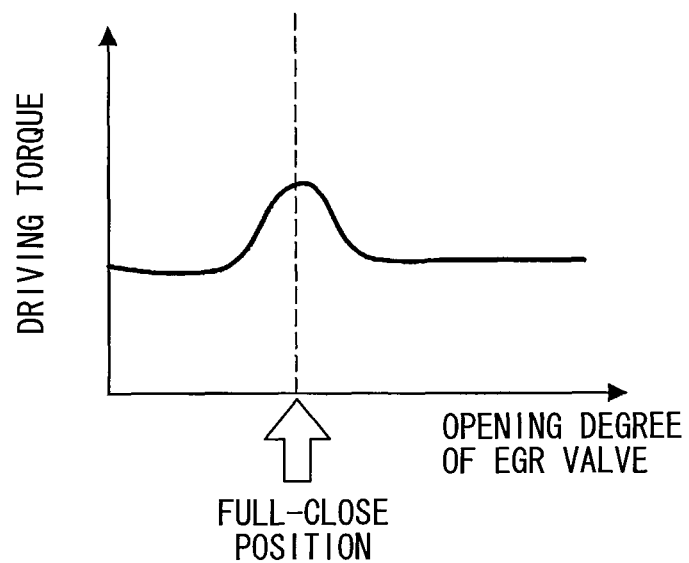
FIG. 3 is a chart for explaining a driving torque characteristic of an EGR valve.

The EGR valve 26 is provided with a seal ring 32 on its outer periphery in order to seal a clearance gap between an outer periphery of the EGR valve 26 and an inner wall surface of the EGR pipe 24. When the EGR valve 26 is positioned at the full-close position, an entire outer periphery of the seal ring 32 is brought into contact with the inner wall surface of the EGR pipe 24. Thus, as shown in FIG. 3, a friction between the EGR valve 26 and the inner wall surface of the EGR pipe 24 becomes maximal and a driving torque (load torque) of the EGR valve 26 become maximal.

Further, as shown in FIG. 1, the engine 11 is provided with a coolant temperature sensor 28 detecting coolant temperature and a crank angle sensor 29 outputting a pulse signal every when the crank shaft (not shown) rotates a specified crank angle. Based on the output signal of the crank angle sensor 29, a crank angle and an engine speed are detected.

The outputs of the above sensors are transmitted to an electronic control unit (ECU) 30. The ECU 30 includes a microcomputer which executes an engine control program stored in a Read Only Memory (ROM) to control a fuel injection quantity, an ignition timing, a throttle position (intake air flow rate) and the like.

The ECU 30 computes a target EGR quantity or a target EGR rate according to an engine driving condition (engine speed, engine load and the like). The ECU 30 controls the opening degree of the EGR valve 26 to obtain the target EGR quantity or the target EGR rate. For example, the ECU 30 computes a target opening degree of the EGR valve 26 based on the target EGR quantity or the target EGR rate. The EGR valve 26 is driven so that the opening degree detected by the sensor 27 agrees with the target opening degree of the EGR valve 26.

Especially, in a gasoline engine, since a sensitivity of combustion stability relative to an EGR gas quantity is relatively high, it is necessary to control the EGR gas quantity with high accuracy. When the exhaust gas recirculation is stopped, it is necessary for the EGR valve 26 to accurately fully close the EGR passage to avoid an EGR gas leakage. Thus, it is necessary to accurately learn a full-close position of the EGR valve 26.

The full-close position does not correspond to a position of the stopper 31.

The ECU 30 obtains an information indicative of a driving torque of the EGR valve 26. This information is referred to as a driving-torque information, hereinafter. Based on this driving-torque information, the ECU 30 learns an opening degree of the EGR valve 26 in which the driving torque becomes maximal, as a full-close position of the EGR valve 26. The opening degree of the EGR valve 26 is referred to as an EGR opening degree, hereinafter.

As shown in FIG. 3, when the EGR valve 26 is positioned at the full-close position, the driving torque of the EGR valve 26 becomes maximal. Thus, the EGR opening degree at which the driving torque becomes maximal is learned as the full-close position. The full-close position of the EGR valve 31 can be accurately learned.

Figure 5:
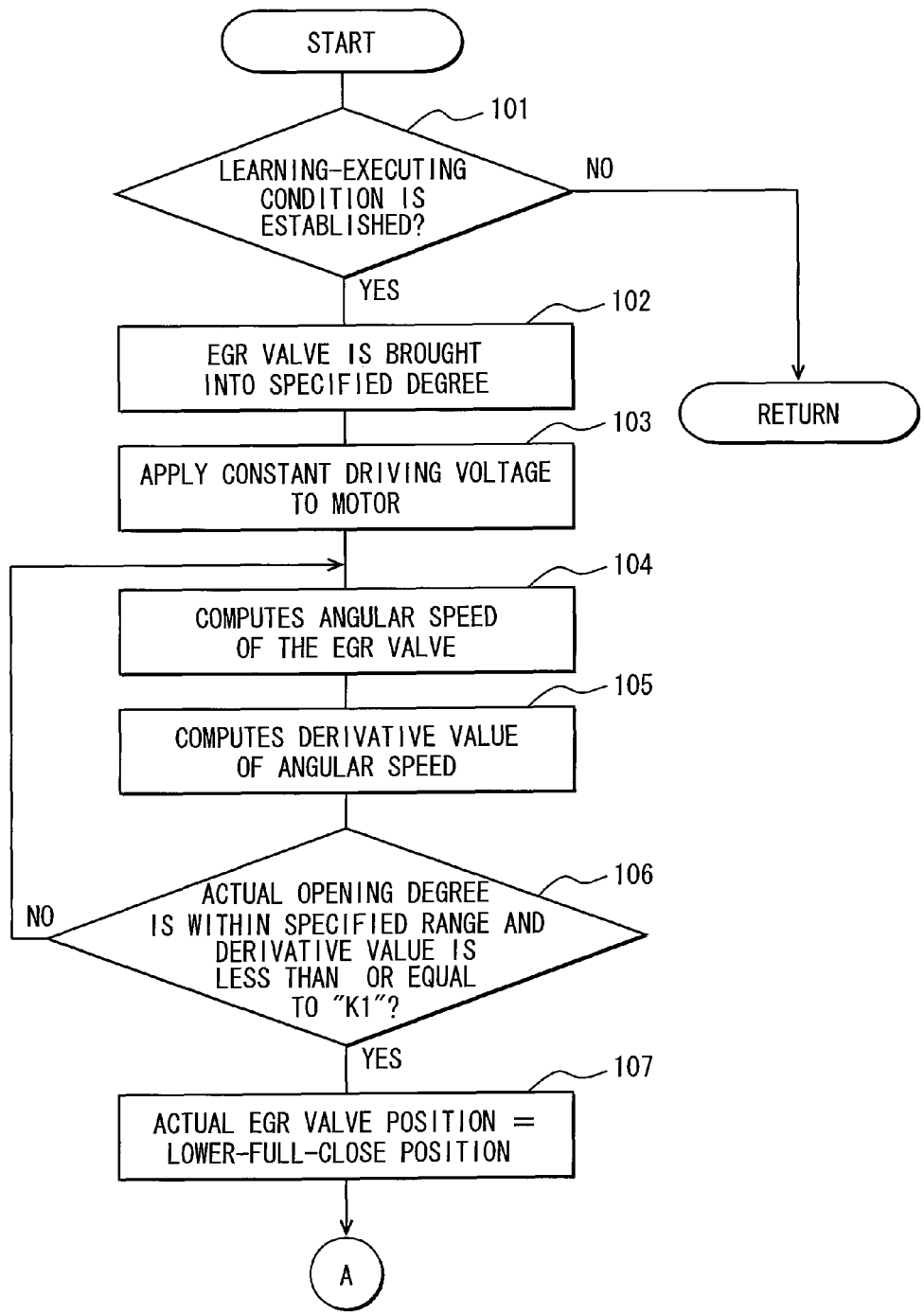
FIGS. 5 and 6 are flow charts for explaining a full-close position learning routine, according to the first embodiment.
Figure 6:
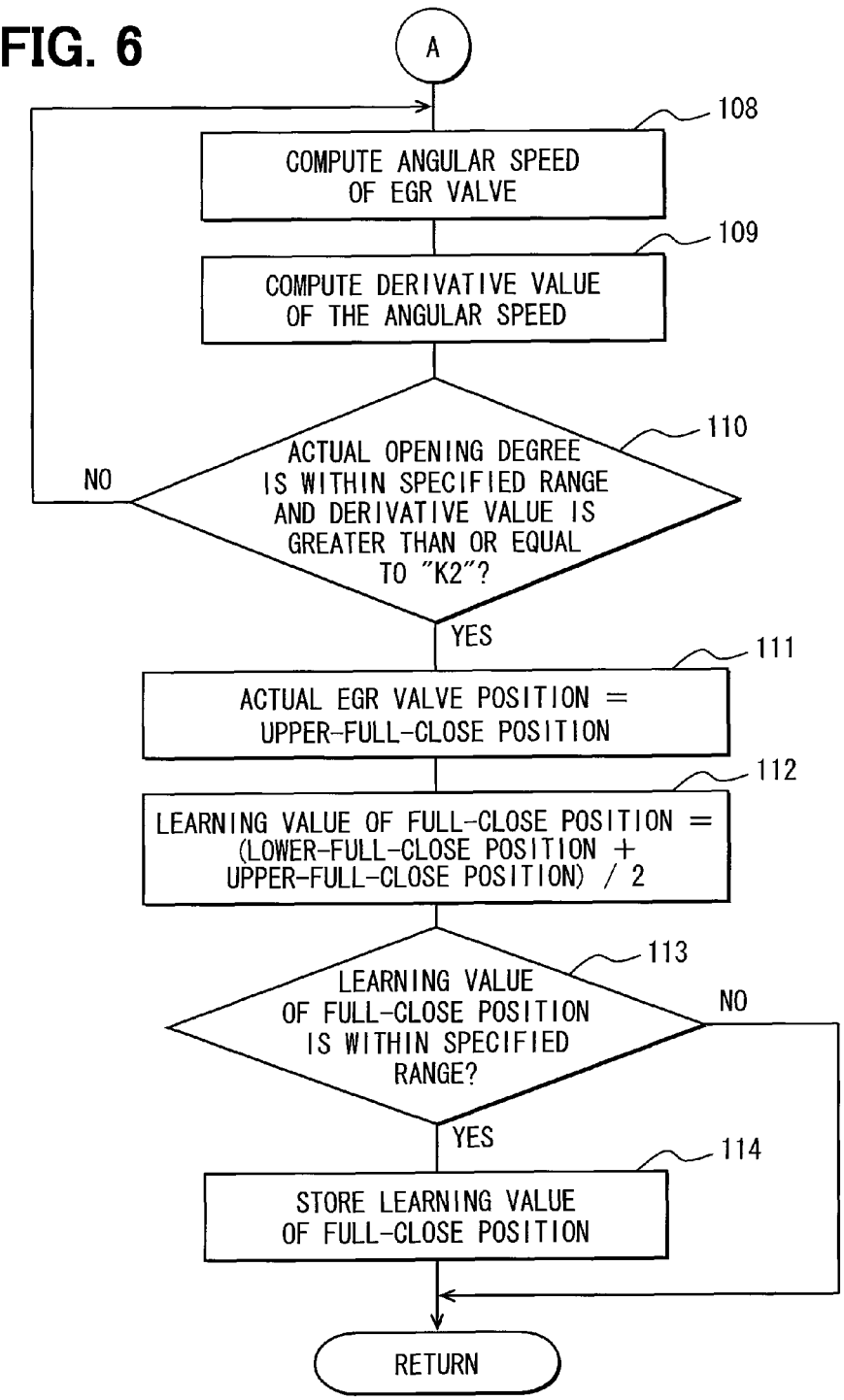

According to the first embodiment, the ECU 30 executes a full-close position learning routine shown in FIGS. 5 and 6. The ECU 30 computes an angular speed of the EGR valve 26 (variation speed of the EGR opening degree) as the driving-torque information. Based on this angular speed of the EGR valve 26, the ECU 30 learns the full-close position of the EGR valve 26. Since the angular speed of the EGR valve 26 depends on the driving torque of the EGR valve 26, the angular speed can be a parameter which accurately represents the driving torque of the EGR valve 26. Thus, based on the angular speed of the EGR valve 26, the full-close position of the EGR valve 26 in which the driving torque becomes maximal can be learned.

Figure 4:
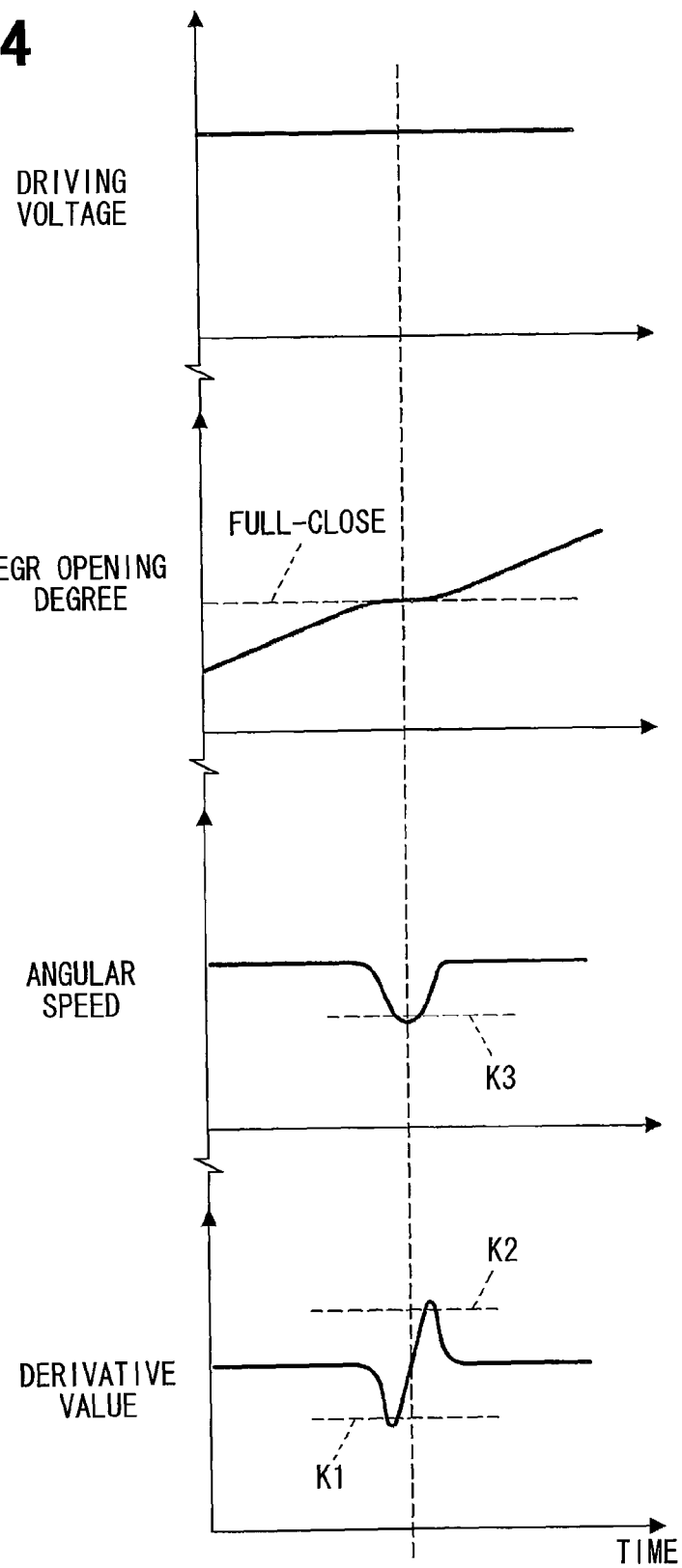
FIG. 4 is a chart for explaining a full-close-position learning according to a first embodiment.

Specifically, as shown in FIG. 4, while the EGR opening degree is varied with a constant driving voltage applied to the motor 26a, the EGR opening degree where the angular speed becomes minimal is learned as the full-close position. In a case that the EGR opening degree is varied with a constant driving voltage, the angular speed of the EGR valve 26 becomes minimal at a position where the driving torque (load torque) of the EGR valve 26 becomes maximal. Thus, the EGR opening degree where the angular speed becomes minimal can be learned as the full-close position of the EGR valve 26 with high accuracy.

Referring to FIGS. 5 and 6, the processes of the full-close-position learning routine will be described hereinafter.

The full-close-position learning routine is executed at a specified cycle while the ECU 30 is ON. This full-close-position learning routine corresponds to a full-close-position learning portion. In step 101, the computer determines whether a specified learning-executing condition is established. That is, the computer determines whether the combustion stability of the engine 11 can be ensured even if the opening degree of the EGR valve 26 is varied.

When the answer is NO in step 101, the routine is finished without performing the subsequent steps.

When the answer is YES in step 101, the procedure proceeds to step 102. In step 102, the EGR valve 26 is driven so that the opening degree of the EGR valve 26 is brought into a specified degree. This specified degree corresponds to a degree which is smaller than an initially designed full-close position (0 degree) or a degree which is smaller than a previous learning value of the full-close position.

Then, the procedure proceeds to step 103 in which a constant driving voltage is applied to the motor 26a so that the EGR opening degree is increased.

Then, the procedure proceeds to step 104 in which the computer computes the angular speed of the EGR valve 26 based on the actual opening degree of the EGR valve 26 which is detected by the sensor 27. In step 105, the computer computes a derivative value of the angular speed (angular acceleration) of the EGR valve 26. The process in step 204 corresponds to a driving-torque-information detecting portion.

Then, the procedure proceeds to step 106 in which the computer determines whether the actual opening degree of the EGR valve 26 is within a specified range and the derivative value of the angular speed is less than or equal to a determination value "K1" shown in FIG. 4. The specified range is established based on the limit position in the movable range of the EGR valve 26, which corresponds to a position at which the EGR valve 26 is brought into contact with the stopper 31. For example, the specified range is a range from the limit position to a specified upper limit degree. The determination value "K1" is for determining whether the derivative value of the angular speed is around a minimal value (bottom value). The determination value "K1" is previously established based on design data and experimental data.

When the answer is NO in step 106, the procedure goes back to step 104.

When the answer is YES in step 106, the procedure proceeds to step 107 in which the current actual opening degree of the EGR valve 26 is defined as a lower-full-close position.

Lower-full-close position=Actual opening degree of EGR valve 26

Then, the procedure proceeds to step 108 in which the angular speed of the EGR valve 26 is computed based on the actual opening degree of the EGR valve 26 detected by the sensor 27. In step 109, the derivative value of the angular speed of the EGR valve 26 is computed. The process in step 108 also corresponds to the driving-torque-information detecting portion.

Then, the procedure proceeds to step 110 in which the computer determines whether the actual opening degree of the EGR valve 26 is within the specified range and the derivative value of the angular speed is greater than or equal to a determination value "K2" shown in FIG. 4. The determination value "K2" is for determining whether the derivative value of the angular speed is around a maximal value (peak value). The determination value "K2" is previously established based on design data and experimental data.

When the answer is NO in step 110, the procedure goes back to step 108.

When the answer is YES in step 110, the procedure proceeds to step 111 in which the current actual opening degree of the EGR valve 26 is defined as an upper-full-close position.

Upper-full-close position=Actual opening degree of EGR valve 26

Then, the procedure proceeds to step 112 in which it is deemed that the angular speed of the EGR valve 26 become minimal at a middle point (average value) of the lower-full-close position and the upper-full-close position. The average value of the lower-full-close position and the upper-full-close position is computed as a learning value of the full-close position of the EGR valve 26.

Learning value of full-close position=(Lower-full-close position+Upper-full-close position)/2

Then, the procedure proceeds to step 113 in which the computer determines whether the learning value of the full-close position is within the specified range. When the answer is YES, the procedure proceeds to step 114 in which the learning value of the full-close position is stored in a nonvolatile memory, such as a backup RAM of the ECU 30. When the answer is NO in step 113, the procedure ends.

According to the above first embodiment, while the EGR opening degree is varied with a constant driving voltage, the EGR opening degree where the angular speed becomes a minimal value is learned as the full-close position of the EGR valve 26. Thus, the full-close position can be learned with high accuracy.

Furthermore, when the learning value of the full-close position is out of the specified range, the learning value of the full-close position is not employed. Thus, an erroneous learning of the full-close position can be avoided, so that a learning accuracy of the full-close position can be improved.

When learning the full-close position based on the angular speed, the learning method is not limited to the above embodiment. For example, when the derivative value of the angular speed becomes the minimal value (bottom value), the EGR opening degree is defined as the lower-full-close position. When the derivative value of the angular speed becomes the maximal value (peak value), the EGR opening degree is defined as the upper-full-close position. The average value of the lower-full-close position and the upper-full-close position may be learned as the full-close position. Alternatively, an EGR opening degree corresponding to an inflection point of the derivative value of the angular speed may be learned as the full-close position.

Alternatively, when the angular speed of the EGR valve 26 is less than or equal to a determination value "K3" shown in FIG. 4, a maximal value and a minimal value of the EGR opening degree are respectively defined as the lower-full-close position and the upper-full-close position and then an average value of the lower-full-close position and the upper-full-close position may be learned as the full-close position. Alternatively, an EGR opening degree of when the angular speed becomes a minimal value (bottom value) may be learned as the full-close position.

Alternatively, one of the lower-full-close position and the upper-full-close position may be learned as the full-close position.

In the above first embodiment, when learning the full-close position based on the angular speed, the EGR opening degree is increased from the specified degree (for example, initially designed full-close position). However, the EGR opening degree may be decreased from the specified degree.

[Second Embodiment]

Figure 7:
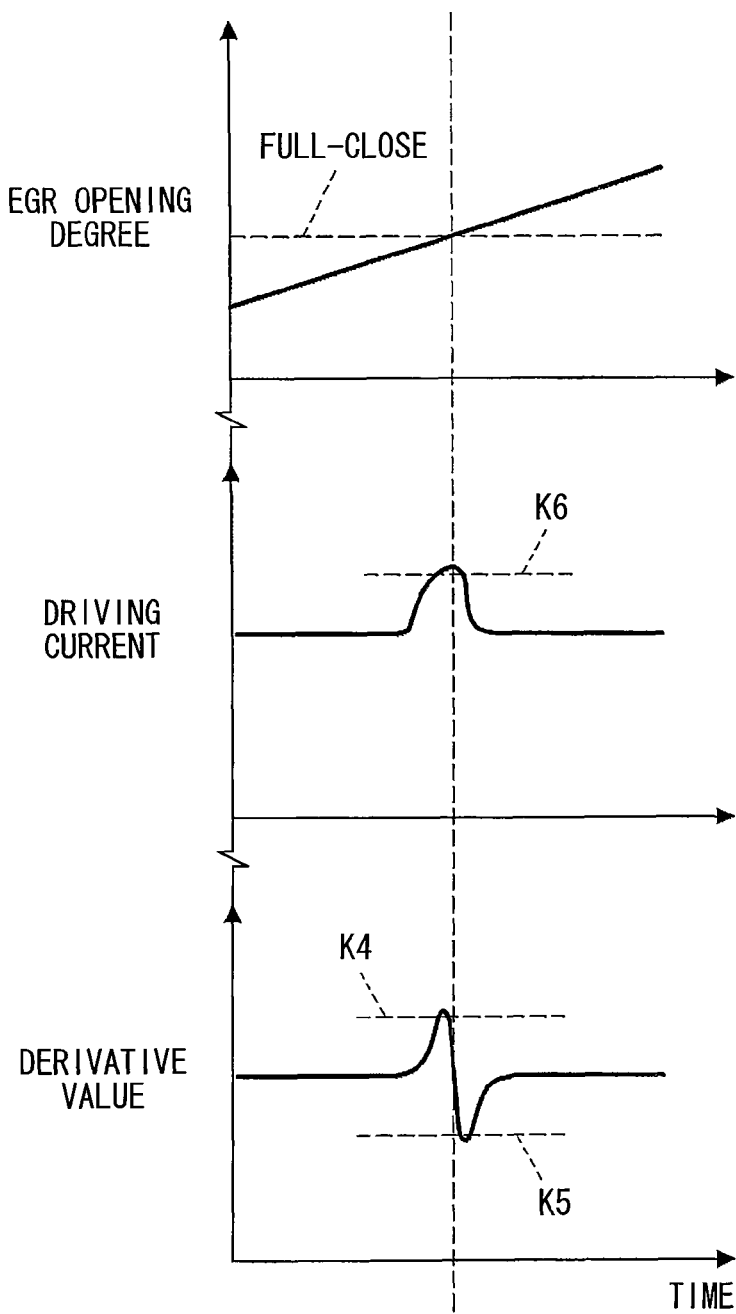
FIG. 7 is a chart for explaining a full-close-position learning according to a second embodiment.
Figure 8:
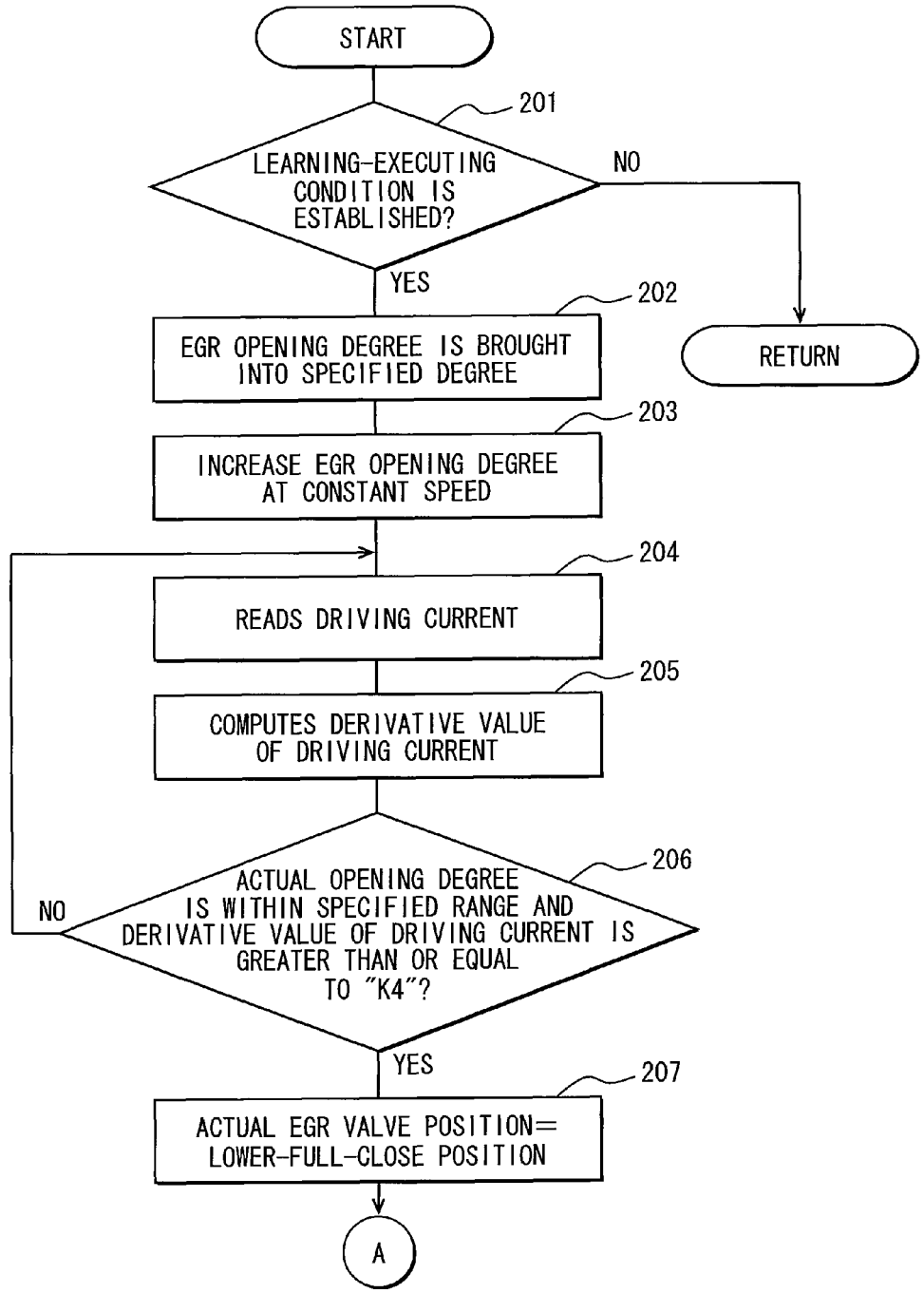
FIGS. 8 and 9 are flow charts for explaining a full-close position learning routine, according to the second embodiment.
Figure 9:
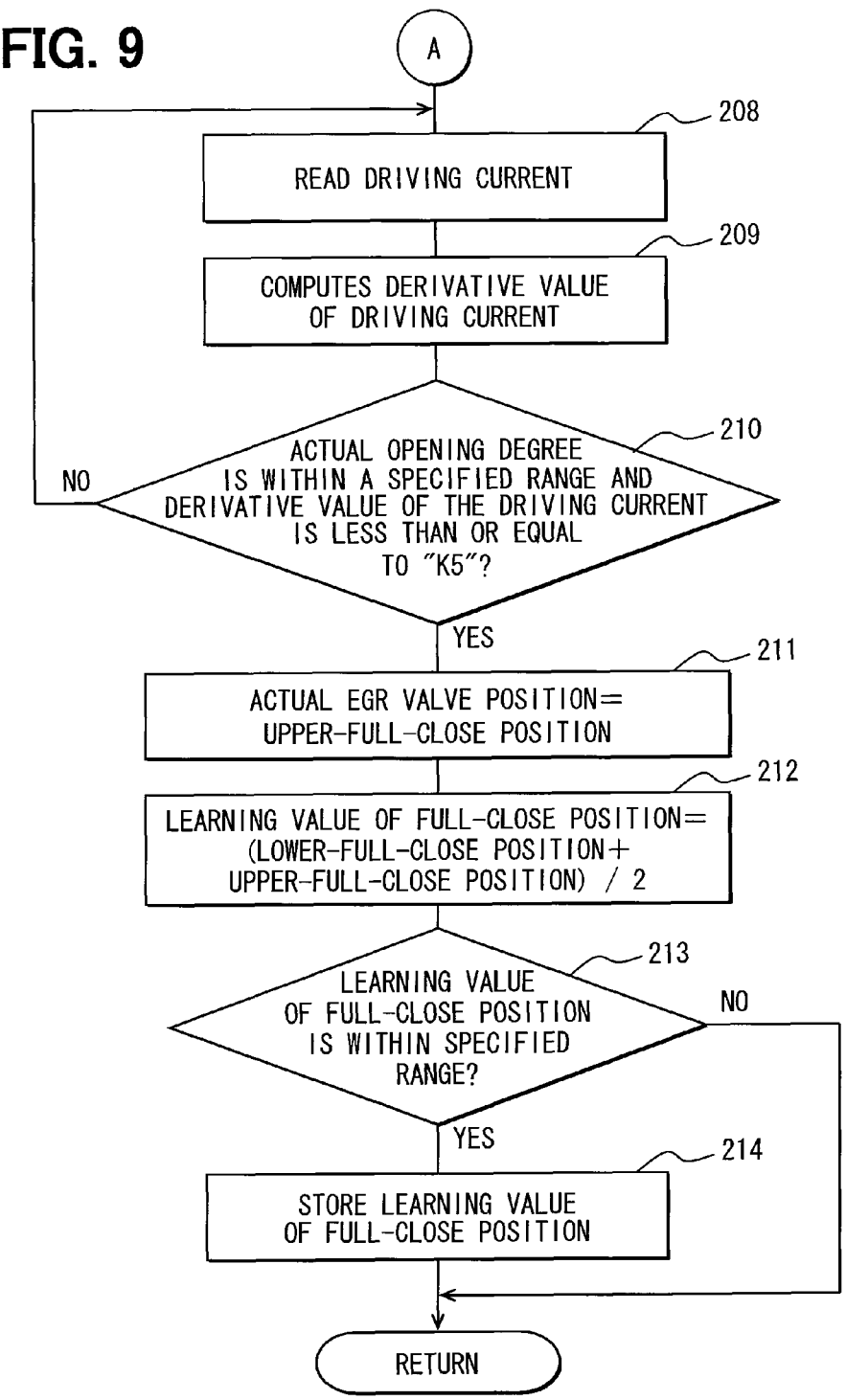

Referring to FIGS. 7 to 9, a second embodiment will be described hereinafter. In the second embodiment, the same parts and components as those in the first embodiment are indicated with the same reference numerals and the same descriptions will not be reiterated.

According to a second embodiment, a current sensor 33 is provided as a driving-torque-information detecting portion for detecting a driving current applied to a driving motor of the EGR valve 26. The ECU 30 executes a full-close-position learning routine shown in FIGS. 8 and 9. Since the driving current for the EGR valve 26 depends on the driving torque of the EGR valve 26, the driving current can be a parameter which accurately represents the driving torque of the EGR valve 26. Thus, based on the driving current for the EGR valve 26, the full-close position of the EGR valve 26 in which the driving torque becomes maximal can be learned.

Specifically, as shown in FIG. 7, when the EGR opening degree is varied at a constant speed, the EGR opening degree at which the driving current becomes a maximal value is learned as the full-close position. In a case that the EGR opening degree is varied with a constant speed, the driving current for the EGR valve 26 becomes a maximal value at a position where the driving torque (load torque) of the EGR valve 26 becomes maximal. Thus, the EGR opening degree where the driving current becomes maximal can be learned as the full-close position of the EGR valve 26 with high accuracy.

Referring to FIGS. 8 and 9, the processes of the full-close-position learning routine will be described hereinafter.

In step 201, it is determined whether a specified learning executing condition is established. When the answer is YES in step 201, the procedure proceeds to step 202. In step 202, the EGR opening degree is brought into the specified degree.

Then, the procedure proceeds to step 203 in which the target EGR opening degree and the EGR opening degree are increased at a constant speed. In step 204, the computer reads the driving current detected by the current sensor 33. In step 205, the computer computes the derivative value of the driving current for the EGR valve 26.

Then, the procedure proceeds to step 206 in which the computer determines whether the actual opening degree of the EGR valve 26 is within the specified range and the derivative value of the driving current is greater than or equal to a determination value "K4" shown in FIG. 4. The determination value "K4" is for determining whether the derivative value of the driving current is around a maximal value (peak value). The determination value "K4" is previously established based on design data and experimental data.

When the answer is NO in step 206, the procedure goes back to step 204.

When the answer is YES in step 206, the procedure proceeds to step 207 in which the current actual opening degree of the EGR valve 26 is defined as a lower-full-close position.

Lower-full-close position=Actual opening degree of EGR valve 26

Then, the procedure proceeds to step 208 in which the driving current detected by the sensor 33 is read. In step 209, the derivative value of the driving current for the EGR valve 26 is computed.

Then, the procedure proceeds to step 210 in which the computer determines whether the actual opening degree of the EGR valve 26 is within a specified range and the derivative value of the driving current is less than or equal to a determination value "K5" shown in FIG. 4. The determination value "K5" is for determining whether the derivative value of the driving current is around a minimal value (bottom value). The determination value "K5" is previously established based on design data and experimental data.

When the answer is NO in step 210, the procedure goes back to step 208.

When the answer is YES in step 210, the procedure proceeds to step 211 in which the current actual opening degree of the EGR valve 26 is defined as an upper-full-close position.

Upper-full-close position=Actual opening degree of EGR valve 26

Then, the procedure proceeds to step 212 in which it is deemed that the driving current for the EGR valve 26 become maximal at a middle point (average value) of the lower-full-close position and the upper-full-close position. The average value of the lower-full-close position and the upper-full-close position is computed as a learning value of the full-close position of the EGR valve 26.

Learning value of full-close position=(Lower-full-close position+Upper-full-close position)/2

Then, the procedure proceeds to step 213 in which the computer determines whether the learning value of the full-close position is within the specified range. When the answer is YES, the procedure proceeds to step 214 in which the current learning value of the full-close position is stored in the backup RAM of the ECU 30. When the answer is NO in step 213, the procedure ends.

As described above, in a case that the EGR opening degree is varied with a constant speed, the driving current for the EGR valve 26 becomes maximal at a position where the driving torque (load torque) of the EGR valve 26 becomes maximal. In view of this, the EGR opening degree where the driving current becomes maximal is learned as the full-close position of the EGR valve 26. Thus, the full-close position can be learned with high accuracy.

When learning the full-close position based on the driving current, the learning method is not limited to the above second embodiment. For example, when the derivative value of the driving current becomes the maximal value (peak value), the EGR opening degree is defined as the lower-full-close position. When the derivative value of the angular speed becomes the minimal value (bottom value), the EGR opening degree is defined as the upper-full-close position. The average value of the lower-full-close position and the upper-full-close position may be learned as the full-close position. Alternatively, an EGR opening degree corresponding to an inflection point of the derivative value of the driving current may be learned as the full-close position.

Alternatively, when the driving current is greater than or equal to a determination value "K6" shown in FIG. 4, a maximal value and a minimal value of the EGR opening degree are respectively defined as the lower-full-close position and the upper-full-close position. And then, the average value of the lower-full-close position and the upper-full-close position may be learned as the full-close position. Alternatively, an EGR opening degree of when the driving current becomes a maximal value (peak value) may be learned as the full-close position.

Alternatively, one of the lower-full-close position and the upper-full-close position may be learned as the full-close position.

In the above second embodiment, when learning the full-close position based on the driving current, the EGR opening degree is increased from the specified degree (for example, initially designed full-close position). However, the EGR opening degree may be decreased from the specified degree.

In the first and second embodiments, the angular speed of the EGR valve 26 or the driving current for EGR valve 26 is used as the driving-torque information. However, a driving torque of the EGR valve 26 is detected or estimated and then the full-close position may be learned based on the detected or estimated driving torque.

Only when the learning executing condition is firstly established after the engine is started, the full-close-position learning may be executed. Alternatively, when the learning executing condition is established after a specified time period is elapsed since the last full-close position learning, the full-close position learning may be executed.

The present disclosure can be applied to an engine provided with a turbocharger, a mechanical supercharger or an electrical supercharger.

The present disclosure can be applied to an engine provided with a low-pressure-loop (LPL) type EGR apparatus in which the exhaust gas is recirculated from downstream of an exhaust turbine in the exhaust pipe to upstream of a compressor in the intake pipe. Also, the present disclosure can be applied to a high-pressure-loop (HPL) type EGR apparatus in which the exhaust gas is recirculated from upstream of the exhaust turbine in the exhaust pipe to downstream of the compressor in the intake pipe.

What is claimed is:

1. An exhaust gas recirculation controller for an internal combustion engine, comprising:
   an EGR valve controlling an exhaust gas quantity recirculating into an intake pipe, the EGR valve being driven in a direction where an opening degree of the EGR valve is increased and in a direction where the opening degree of the EGR valve is decreased with respect to a full-close position of the EGR valve where a rotating friction of the EGR valve becomes a maximal value;
   a driving-torque-information detecting portion for detecting a driving-torque information about a driving torque of the EGR valve; and
   a full-close-position learning portion for learning an opening degree of the EGR valve as a full-close position, based on the driving-torque information, where the driving torque of the EGR valve becomes maximal.

2. An exhaust gas recirculation controller for an internal combustion engine according to claim 1, wherein:
   the driving-torque-information detecting portion detects an angular speed of the EGR valve as the driving-torque information; and the full-close-position learning portion learns the full-close position based on the angular speed of the EGR valve.

3. An exhaust gas recirculation controller for an internal combustion engine according to claim 2, wherein:
the full-close-position learning portion learns an opening degree of the EGR valve where the angular speed becomes minimal as the full-close position, while the opening degree of the EGR valve is varied with a constant driving voltage supplied to a motor driving the EGR valve.

4. An exhaust gas recirculation controller for an internal combustion engine according to claim 2, wherein:
the full-close-position learning portion learns the opening degree of the EGR valve of when a derivative value of the angular speed becomes a maximal value as the full-close position, while the opening degree of the EGR valve is varied with a constant driving voltage applied to a motor driving the EGR valve.

5. An exhaust gas recirculation controller for an internal combustion engine according to claim 2, wherein:
the full-close-position learning portion learns an average value of the opening degree of the EGR valve of when a derivative value of the angular speed becomes a maximal value and the opening degree of the EGR valve of when the derivative value of the angular speed becomes a minimal value as the full-close position, while the opening degree of the EGR valve is varied with a constant driving voltage supplied to a motor driving the EGR valve.

6. An exhaust gas recirculation controller for an internal combustion engine according to claim 1, wherein:
the driving-torque-information detecting portion detects a driving current applied to a motor driving the EGR valve as the driving-torque information; and
the full-close-position learning portion learns the full-close position based on the driving current.

7. An exhaust gas recirculation controller for an internal combustion engine according to claim 6, wherein:
the full-close-position learning portion learns the opening degree of the EGR valve of when the driving current becomes maximal as the full-close position, while the opening degree of the EGR valve is varied at a constant speed.

8. An exhaust gas recirculation controller for an internal combustion engine according to claim 6, wherein:
the full-close-position learning portion learns the opening degree of the EGR valve of when a derivative value of the driving current becomes a minimal value as the full-close position, while the opening degree of the EGR valve is varied at a constant speed.

9. An exhaust gas recirculation controller for an internal combustion engine according to claim 2, wherein:
the full-close-position learning portion learns an average value of the opening degree of the EGR valve of when a derivative value of the driving current becomes a maximal value and the opening degree of the EGR valve of when the derivative value of the driving current becomes a minimal value as the full-close position, while the opening degree of the EGR valve is varied at a constant speed.

10. An exhaust gas recirculation controller for an internal combustion engine according to claim 1, wherein:
when a learning value of the full-close position learned based on the driving-torque information is within a specified range of a movable range of the EGR valve, the full-close-position learning portion employs the learning value of the full-close position.

* * * * *